Sept. 27, 1938.  A. HENDERSON  2,131,474
APPARATUS FOR MAKING CONCRETE ARTICLES
Filed Feb. 8, 1936  2 Sheets-Sheet 1

WITNESSES  INVENTOR.

Sept. 27, 1938.  A. HENDERSON  2,131,474
APPARATUS FOR MAKING CONCRETE ARTICLES
Filed Feb. 8, 1936  2 Sheets-Sheet 2
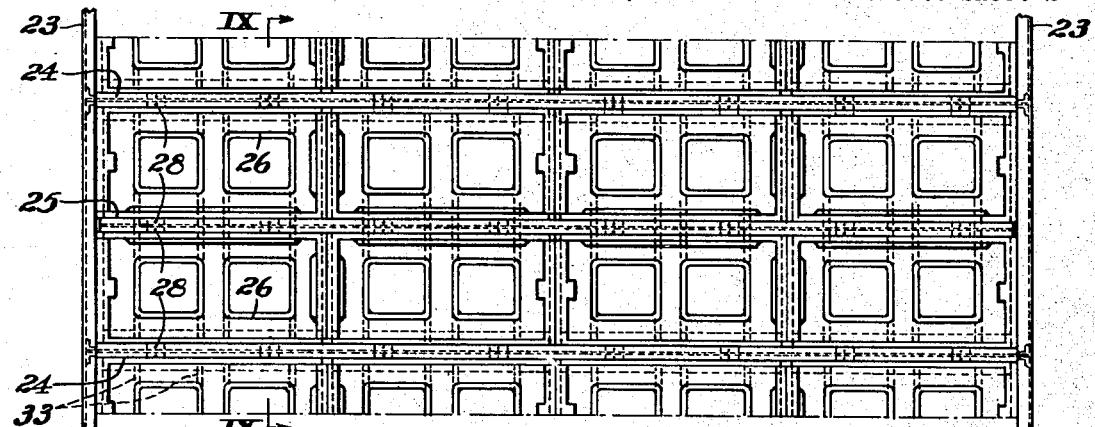
Fig. 8.
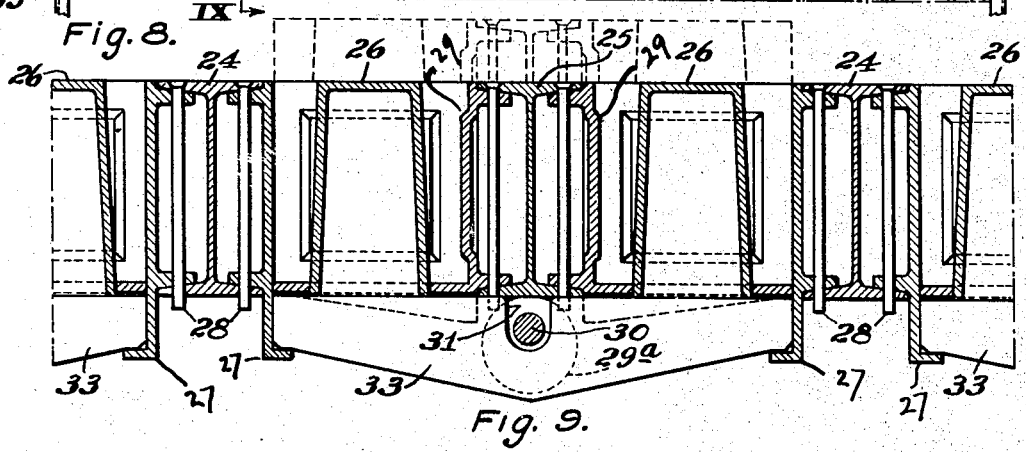
Fig. 9.
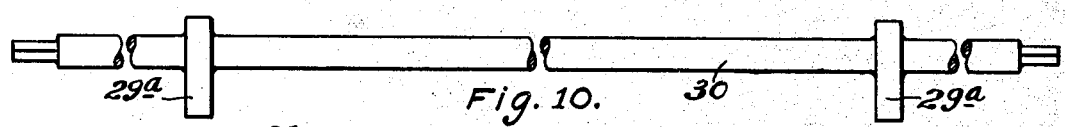
Fig. 10.
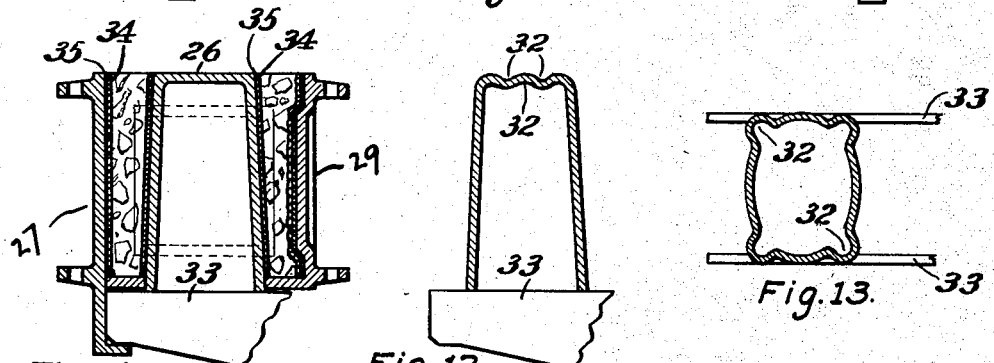
Fig. 14.  Fig. 12.  Fig. 13.
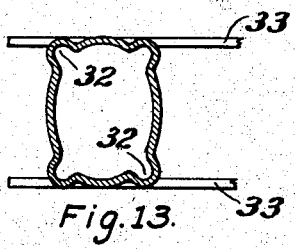
FIG. 11.
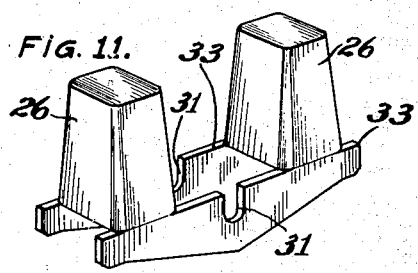
WITNESSES
A. B. Wallace.
INVENTOR.
Albert Henderson Patented Sept. 27, 1938

2,131,474

UNITED STATES PATENT OFFICE 2,131,474

APPARATUS FOR MAKING CONCRETE ARTICLES

Albert Henderson, Pittsburgh, Pa., assignor to William P. Witherow, Pittsburgh, Pa.

Application February 8, 1936, Serial No. 62,965

5 Claims. (Cl. 25—121)

This invention relates to an improved apparatus for making concrete articles for building purposes such as concrete block, shingles, brick, slabs, etc. wherein better products are obtained at lower cost than from present practice. The method described herein is also disclosed and claimed in my copending application Serial No. 223,300, filed August 5, 1938, for "Method of making concrete blocks and the like".

Concrete products shrink when laid in the wall, thereby causing cracks. This shrinkage is due to improper aging, or is caused by the loss of any moisture contained in the article. To properly age the articles and insure the delivery to the job of dry concrete articles, I mould and cure the articles in an inclosed aging chamber. The cured articles are stacked alongside the curing chamber to age. This reduces the movements of the articles to a minimum, thereby preventing breakage, and the waste heat from the curing chamber properly ages the articles in the inclosed aging chamber. The aging chamber being inclosed, the articles are protected from the action of frost and the articles are further prevented from absorbing water from either snow or rain.

I also provide a simple arrangement of gang moulds, whose parts are few in number, and if broken are easily replaced. I show a pallet having in combination side and end mould wall members and cores. This insures absolute rigidity so that the movement of the pallet does not disfigure the surface of the article in contact with the side walls. I further provide for the breaking of the bond of the article to the mould, by a simple arrangement of cams positioned under the slideable member of the gang mould. This cam reacts against a core and elevates the sliding member and the articles slightly above the moulds, but the articles are still kept within the mould for further hardening so as to be as close as possible to the heating means positioned beneath the moulds. I provide an overhead means for transporting a slidable member of the gang moulds on which are supported a plurality of articles, which while cured are still somewhat green. These cured articles being moved in this fashion reduces to a minimum the handling of the products, thereby eliminating much of the breakage and chipping caused by handling the articles individually. Furthermore, this method makes it unnecessary for a lid or cover to inclose the moulds as the heat is confined in the cores, and between the mould wall members and their supporting means. The heat radiated from the moulds heats the aging chamber and expedites the aging of the articles stored alongside of the continuous gang moulds. I further provide for certain articles a one piece collapsible core, and I also provide compressible surfaces for the cores and wall moulds. The concrete adheres firmly to the moulding medium, particularly if the moulds are made of metal and breaking this bond when the concrete is set sufficiently assures ease in removing the articles from the moulds without damage.

I use a ready mixed concrete truck to fill a series of gang moulds positioned over a heating means. This arrangement of plant and method of operation greatly reduces investment and labor costs, and as the ready mixed concrete truck owners have their own bins and measuring devices, it is not necessary to provide the plant with bins, batchers, elevators, mixers, pulleys, motors, cars and individual pallets, as required by present practice. When the trucks have filled the moulds they can be used elsewhere.

In the accompanying drawings the preferred embodiment of my invention has applied to the manufacture of concrete blocks having an ornamental face.

Figure 8 is a top plan view of gang moulds.

Figure 9 is a longitudinal section through Figure 8.

Figure 10 is a side elevation of cam and bar.

Figure 11 is a view of the cores for the moulds.

Figure 12 is a vertical cross section through one piece compressible core.

Figure 13 is a horizontal cross section of one piece compressible core.

Figure 14 is a section through a mould and core having compressible sheet metal surfaces.

Figure 1:
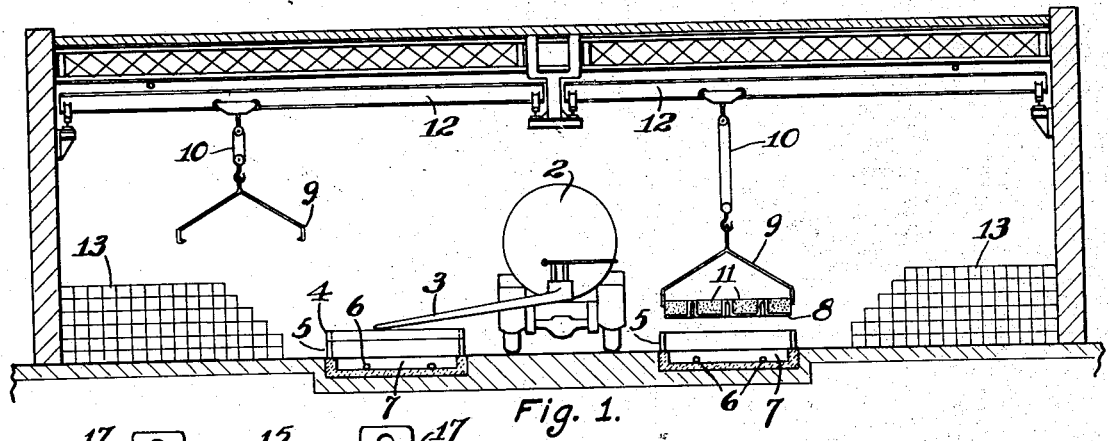
Figure 1 is a cross section through the plant.

Referring in detail to the drawings, Figure 1 shows my plant layout in an inclosed building. Ready mixed concrete truck 2 mixes and delivers concrete through chute 3 to traveling hopper 4 to which it is detachably secured so that mixer truck 2 draws hopper 4 over gang moulds 5. When the moulds 5 are filled and properly leveled and vibrated, heat from steam pipe 6 placed in water in trough 7 cures the products in gang moulds 5 which are stationary, and when the product has set sufficiently the articles are extruded slightly so that a bond of the concrete to the mould is broken. After the articles have been cured a slideable member 8 in the gang mould is secured by tongs 9 and elevated by chain hoist 10 and the blocks 11 resting on member 8 are transported by traveling crane 12 to stock pile 13 to age. Then the member 8 is returned to gang mould 5 and the operation is repeated.

When the blocks are aged sufficiently for shipment they may be placed on removable rollers positioned over the moulds and passed therealong to a truck in the aisle used by the ready mixed concrete truck.

Figure 2:
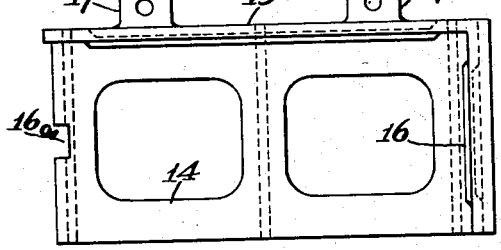
Figure 2 is a top plan view of combination of pallet and two mould walls.
Figure 3:
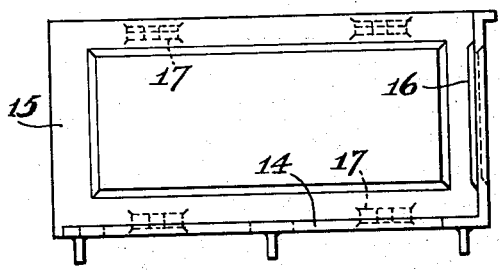
Figure 3 is a front elevation of Figure 2.
Figure 4:
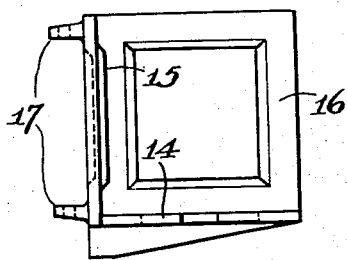
Figure 4 is an end view of Figures 2 and 3.

Figures 2, 3 and 4 show a member of gang mould 5 having a cored pallet 14 in combination with an ornamental side wall 15 and an ornamental end wall 16, cored lugs 17 being secured to mould wall 15. A recess 16A is formed in pallet 14. This combination shown in Figures 2, 3 and 4 may be made in one piece of cast iron, and is a part of slideable member 8.

Figure 5:
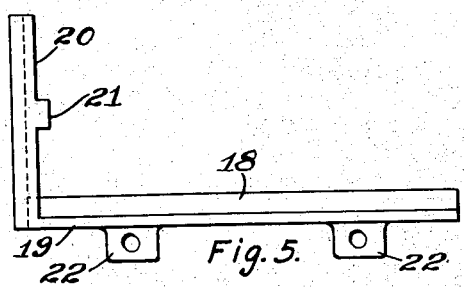
Figure 5 is a top plan view of combination of core support and two side mould walls.
Figure 6:
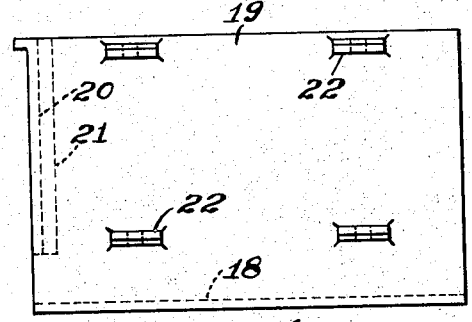
Figure 6 is a front elevation of Figure 5.
Figure 7:
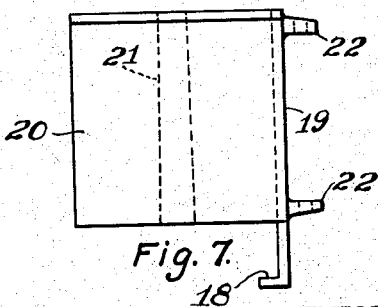
Figure 7 is an end view of Figures 5 and 6.

Figures 5, 6 and 7 show a member of gang mould 5 having core supports 18 in combination with the side mould wall 19 and an end mould wall 20. Recess forming member 21 fits into recess 16A in Figure 2. Cored lugs 22 are secured to side wall 19. This combination shown in Figures 5, 6 and 7 may be made in one piece of cast iron, and is a part of the stationary gang mould 5. This part of the gang mould is not removed.

Figure 8 is a part of gang mould 5 showing continuous side steel channels 23, to which are bolted spaced I-beams 24 between which is placed slideable I-beam 25. This I-beam 25 corresponds to member 8 of Fig. 1. To I-beams 24 are attached the eight castings as shown in Figures 5, 6 and 7, the only difference being that four of the castings are right side and four of the castings are left side, and on slideable I-beam 25 eight right and left castings such as shown in Figures 2, 3 and 4 are attached. The area between the webs of channels 23 and I-beams 24 and 25 and the mould walls affords room for the heat from the curing means below to circulate freely, so that ample heat is delivered to every square inch of the outside surface of the articles and as the cores are hollow the heat can quickly reach every square inch of the inside surfaces of the articles. Therefore, by keeping the moulding means and articles as close to the heating means as possible, the moulds can be emptied more quickly. The side walls, end walls and recess forming members in the casting attached to fixed I-beam 24 have a slight taper so that the movement of slideable member 8 and the articles is thereby facilitated. Channels 23 are bolted to concrete trough 7. The gang moulds 5 may be continuous or they may be made in sections, every second I-beam being slidable as I-beam 25. This means that there are stationary channels and I-beams somewhat on the order of a ladder and between the stationary I-beams are positioned slideable I-beams. To these I-beams are attached the mould members as described.

Figure 9 which is a section through 9—9 in Figure 8 shows the castings attached to I-beam members. I-beam members 24 support castings 27 as shown in detail in Figures 5, 6 and 7. Through holes in flanges and lugs 22, pins or bolts 28 are inserted, thereby securing the castings 27 to fixed I-beam 24. Likewise pins or bolts secure castings 29 to slideable I-beam 25, thereby constituting slideable member 8. Cores 26 as shown in Figure 11 are supported by core bars 33 on castings 27. The cores project up through the pallet of casting 29. Between the slideable I-beam 25 and the core bars 33, a cam 29A and shaft 30, as shown in Figure 10 are positioned so that the bond between the mould on the articles can be broken by the cam action, the pressure tending to pull the cores down and the slideable member 8 up. This pressure also tends to keep castings 27 and cores 26 in place.

Figure 10 is a drawing of a cam 29A and shaft 30. The ends are squared for the reception of a wrench and may project through holes in channel 23. The slideable member 8 rests on this cam and when the cam is turned it elevates the member and its blocks slightly above the gang mould 5 as shown in dotted lines in Fig. 9. I reserve the right, however, to use a cam which would fully eject the blocks above the gang mould 5.

Figure 11 is a view of cores 26 attached to core bars 33. The recess 31 holds cam 29A and shaft 30 in place. These cores and bars may be made in one casting, or the cores may be made individually with holes for the introduction of separate core bars. The cores shown in Figure 11 are hollow.

Figures 12 and 13 show a collapsible core made from one piece of sheet metal. The design of the core permits enough movement of the metal towards the center so that core can free itself easily from the concrete articles. Corrugations 32 make this possible. These cores are shown tapered, but they may be made without tapering. The ends of these cores may be detachably secured at their corners to core bars 33.

Figure 14 shows mould members 27 and 29 and core 26 having sheet metal surfaces 34. Asphalted asbestos paper holds the sheet metal to the mould, the paper providing enough movement of the mould surfaces to permit the easy extraction of the articles therefrom. The sheet metal in this figure and in Figures 12 and 13 should be stainless steel.

While I have illustrated and described the preferred form of my invention, it will be understood that it is not thus limited, but may be otherwise practiced or embodied within the scope of the following claims.

I claim as my invention:

1. A mold comprising a pair of adjacent side walls and a bottom rigidly connected together, means mounting said walls and bottom for movement as a unit, two additional side walls rigidly connected together but free from the first-mentioned side walls and bottom, and means supporting said additional side walls independently of the other side walls.

2. Molding apparatus comprising spaced fixed supporting members, an intermediate movable supporting member, individual molds between said fixed and movable members, each mold including a pair of adjacent side walls and a bottom carried on said movable member, and another pair of adjacent side walls carried on one of said fixed members.

3. Molding apparatus comprising spaced fixed supporting members, an intermediate movable supporting member, individual molds between said fixed and movable members, each mold including a pair of adjacent side walls and a bottom having openings therein carried on said movable member, and another pair of adjacent side walls carried on one of said fixed members, fixed transverse bars extending between said fixed members, and cores on said bars extending upwardly through the openings in said bottoms.

4. Molding apparatus comprising spaced fixed supporting members, an intermediate movable supporting member, individual molds between said fixed and movable members, each mold including a pair of adjacent side walls and a bottom carried on said movable member and another pair of adjacent side walls carried on one of said fixed members, and means extending beneath said movable member and having engagement with the latter to lift it.

5. Molding apparatus comprising spaced fixed supporting members, an intermediate movable supporting member, individual molds between said fixed and movable members, each mold including a pair of adjacent side walls and a bottom having openings therein carried on said movable member, and another pair of adjacent side walls carried on one of said fixed members, fixed transverse bars extending between said fixed members, cores on said bars extending upwardly through the openings in said bottoms, and a cam shaft extending beneath said movable member and having cams engaging the latter to lift it, said shaft also being effective to hold said transverse bars against movement with said movable member.

ALBERT HENDERSON.